(12) United States Patent
Mumick

(10) Patent No.: US 11,294,562 B2
(45) Date of Patent: *Apr. 5, 2022

(54) MULTI-GESTURE MEDIA RECORDING SYSTEM

(71) Applicant: MULTIMODAL MEDIA LLC, Marshall, TX (US)

(72) Inventor: Kieraj Singh Mumick, Berkeley Heights, NJ (US)

(73) Assignee: MULTIMODAL MEDIA LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/117,114

(22) Filed: Dec. 10, 2020

(65) Prior Publication Data

US 2021/0096718 A1 Apr. 1, 2021

Related U.S. Application Data

(63) Continuation of application No. 16/735,730, filed on Jan. 7, 2020, now Pat. No. 10,884,609, which is a continuation of application No. 14/051,735, filed on Oct. 11, 2013, now Pat. No. 10,552,030.

(60) Provisional application No. 61/713,635, filed on Oct. 15, 2012.

(51) Int. Cl.
*G06F 3/0488* (2013.01)
*G06F 3/0484* (2022.01)
*G06F 3/0487* (2013.01)
*H04M 1/656* (2006.01)
*G06F 3/04883* (2022.01)

(52) U.S. Cl.
CPC .......... *G06F 3/0488* (2013.01); *G06F 3/0484* (2013.01); *G06F 3/0487* (2013.01); *G06F 3/04883* (2013.01); *H04M 1/656* (2013.01); *H04M 2250/22* (2013.01)

(58) Field of Classification Search
None
See application file for complete search history.

(56) References Cited

U.S. PATENT DOCUMENTS

| 2004/0216059 | A1* | 10/2004 | Vong | G06F 3/1431 |
| | | | | 715/840 |
| 2004/0225502 | A1* | 11/2004 | Bear | G06F 3/0219 |
| | | | | 704/270 |
| 2007/0296552 | A1* | 12/2007 | Huang | G08C 17/02 |
| | | | | 340/10.5 |

* cited by examiner

*Primary Examiner* — Tuan S Nguyen
(74) *Attorney, Agent, or Firm* — Ashok Tankha

(57) ABSTRACT

A computer implemented method and system for recording media data such as audio data in one or more communication modes based on gestures on a graphical user interface (GUI) of an electronic device is provided. A gesture based media recording application (GBMRA) provided on the electronic device defines multiple interface regions on the GUI. The GBMRA detects a gesture on an interface region and performs a first action associated with recording of the media data in a communication mode. The GBMRA detects another gesture on the same interface region or another interface region and performs a second action. The first action and the second action include at least one of triggering recording of the media data, switching from one communication mode to another for recording the media data, canceling recording of the media data, generating and displaying multiple options for performing an operation associated with the recorded media data, etc.

12 Claims, 13 Drawing Sheets

MULTI-GESTURE MEDIA RECORDING SYSTEM

CROSS REFERENCE TO RELATED APPLICATIONS

This application is a continuation application of non-provisional patent application Ser. No. 16/735,730, titled "Multi-gesture Media Recording System", filed in the United States Patent and Trademark Office on Jan. 7, 2020, which is a continuation application of non-provisional patent application Ser. No. 14/051,735, titled "Multi-gesture Media Recording System", filed in the United States Patent and Trademark Office on Oct. 11, 2013, now U.S. Pat. No. 10,552,030B2, which claims benefit of provisional patent application No. 61/713,635 titled "Multi-gesture Audio Recording System", filed in the United States Patent and Trademark Office on Oct. 15, 2012.

The specifications of the above referenced patent applications are incorporated herein by reference in their entirety.

BACKGROUND

Prior to the age of smart phones and mobile tablets, the need for recording media data, for example, audio data, video data, or any other media data in the form of a message, a media clip, etc., while on the move was not high. One method to record, for example, audio data was to make a phone call, speak on the phone, and record a user's voice on the other end of the line, for example, when using answering machines and voicemails, or when speaking on a recorded line. However, as technology developed and electronic devices such as smart phones, tablets, etc., became popular, mobile applications for recording audio data and other media data on such electronic devices gained popularity. For example, multiple communication modes such as a push to talk (PTT) communication mode, a tap to start (TTS) communication mode, a release to record (RTR) communication mode, a release to stop (RTS) communication mode, a tap to end (TTE) communication mode, etc., were developed for recording audio data.

In the push to talk (PTT) communication mode, a user presses or pushes and holds a button on an electronic device, for example, a mobile phone, or taps on an icon on a graphical user interface (GUI) of the electronic device and keeps the button or icon pressed. The user records media data while the button is pushed down or pressed. The recording of the media data continues as long as the button is held or pressed. When the button is released, the recording stops. Upon release of the button, a recorder of the electronic device terminates the recording of the media data, saves the recorded media data, for example, in the form of a media clip, a media message, etc., and stores the recorded media data on the electronic device, or sends the recorded media data to a network or to another electronic device. This PTT communication mode provides the user with one click easy method to record short media data.

The tap to start (TTS) communication mode requires a user to first click on a start button or an initiation button on the electronic device to start the recording process. In this case, the user clicks, that is, taps and releases the button, at which time a recorder of the electronic device initiates recording of the media data. The user then has to tap on a stop button on the electronic device to stop the recording. After tapping on the stop button, the recorder terminates the recording and saves the recorded media data. There is also a variation of the TTS communication mode, where a user is not required to click the stop button on the electronic device. Instead, the electronic device performs a voice activity detection to determine when the user has stopped speaking, and at this time the electronic device automatically terminates the recording of the media data and saves the media data.

After initiating recording of media data, the release to record (RTR) communication mode allows a user to release the initiation button on the electronic device to continue the recording process. In the RTR communication mode, the user can either keep the button held while recording or can release the button to continue recording. A user can switch from one mode of recording to another by releasing the button. The tap to end (TTE) communication mode is triggered after the user releases the button, and the recording process is then in progress, and the user can terminate the recording by tapping on the button. In this case, the user has to tap on a stop button on the electronic device to terminate the recording. After tapping on the stop button, the recorder terminates the recording of the media data and saves the recorded media data. In the release to stop (RTS) communication mode, the user is required to release the button on the electronic device to stop or terminate the recording process. In the RTS communication mode, the user can either keep the button pressed to continue recording or can release the button to stop recording.

The push to talk (PTT) communication mode allows a user to record short media data quickly, with a single press of a button on the electronic device, that is, all the user is required to do is press the button and then release the button. However, in the PTT communication mode, the user finds it difficult to record lengthy media data. The user is forced to interact with the electronic device throughout the recording of the media data, which makes the process for recording lengthy media data inconvenient. While recording a long media message, the user's finger may inadvertently slip off the "push to talk" button on the electronic device, which would indicate to the electronic device that the user wants to terminate the recording, thereby causing the electronic device to abruptly terminate the recording of the media message even though the user intended to continue recording the media message. It is also not feasible for a user, while pressing a button, to place a smart phone at his/her ear to speak, forcing him/her to use a speakerphone.

Moreover, the above mentioned models for recording media data do not offer a method for the user to cancel the recording once begun, or perform any other action such as switching from one communication mode to another communication mode, unless the graphical user interface provides an additional user interaction option, after the recording is completed, that would request the user whether he/she would like to save or cancel the last recording, or perform any other action. Such an interaction makes it inconvenient for the user to record the media data because such an interaction adds one additional, typically unnecessary step, to record the media data.

Hence, there is a long felt but unresolved need for a computer implemented method and system that records media data in one or more communication modes based on a user's gestures on a graphical user interface of the user's electronic device, while allowing the user to switch between the communication modes for recording the media data, or to cancel recording of the media data, or to perform any other action associated with the media data at any time during and/or after the recording of the media data.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and system disclosed herein addresses the above stated needs for recording media data in one or more of multiple communication modes based on one or more gestures of a user on a graphical user interface (GUI) of the user's electronic device, while allowing the user to switch between the communication modes for recording the media data, or to cancel recording of the media data, or to perform any other action associated with the media data at any time during and/or after the recording of the media data. As used herein, the term "media data" refers to a stored form of media, for example, sounds, images, videos, etc., produced and recorded for the purpose of audibly listening to a reproduction of those sounds or for the purpose of viewing a reproduction of those images, videos, etc. The media data comprises, for example, audio data, or video data, or audiovisual data, or image data, or multimedia data, etc., or any combination thereof. The media data can be stored, for example, as a media clip, a media message, etc., or in any digital format. Also, as used herein, the term "media message" refers to a message that can be recorded on a user's electronic device, for example, a cellular phone, a smart phone, a tablet computing device, a personal digital assistant, a laptop, a touch centric device, a digital camera, a television, a car, a gaming console, etc., or any other mobile device configured for communication. The media message is, for example, an audio message, or a video message, or an audiovisual message, or a picture message, or a multimedia message, etc., or any combination thereof. Also, as used herein, the term "communication mode" refers to a mode for initiating, continuing, and/or terminating recording of media data on an electronic device. The communication modes comprise, for example, a push to talk (PTT) communication mode, a tap to start (TTS) communication mode, a release to record (RTR) communication mode, a release to stop (RTS) communication mode, a tap to end (TTE) communication mode, etc. Also, as used herein, the term "gesture" refers to a user action or an actuation by a user performed manually, for example, by use of a finger, a thumb, a hand, etc., on the GUI, or by using an input device, for example, a physical button, a computer mouse, a pointing device, a light pen, a touch pad, a touch sensitive display device, a track ball, a pointing stick, any device capable of sensing a tactile input, etc.

The computer implemented method and system disclosed herein provides a gesture based media recording application, hereafter referred to as a "media recording application", executable by at least one processor configured to manage the GUI of the electronic device and actions associated with the recording of the media data in one or more communication modes on the electronic device. The media recording application defines multiple interface regions on the GUI of the electronic device. As used herein, the term "interface region" refers to an area provided on the GUI of an electronic device that enables interfacing and interactions with a user of the electronic device. The media recording application associates a predefined function from multiple predefined functions with each of the defined interface regions on the GUI. The predefined functions comprise, for example, record media data using a push to talk communication mode, record media data using a tap to start communication mode, record media data using a release to record communication mode, stop or terminate the recording of media data using a release to stop communication mode or a tap to end communication mode, stream the media data to a server via a network during or after the recording process, or at predefined intervals after initiation of the recording process, cancel a media recording, etc. In an embodiment, the media recording application dynamically changes the predefined function associated with one of the defined interface regions to another predefined function based on one or more communication modes and user preferences. In another embodiment, the media recording application configures predefined functions for one or more of the defined interface regions based on user preferences.

The media recording application detects one of several gestures on one of the defined interface regions. The gestures comprise, for example, a drag and drop gesture, a click gesture, a double click gesture, a click and hold gesture, a tap gesture, a tap and hold gesture, a hold and swipe gesture, a touch gesture, a slide gesture, a glide gesture, a scrolling gesture, etc., or any combination thereof. The media recording application performs a first action associated with the recording of the media data in one of the communication modes on detection of a gesture on one of the defined interface regions. The media recording application then detects another gesture on the same defined interface region or on another one of the defined interface regions. The media recording application performs a second action in response to the detection of the other gesture on the same or other defined interface region. In an embodiment, the second action is the same as the first action. In another embodiment, the second action is different from the first action. The first action and the second action performed by the media recording application comprise at least one of, for example, triggering recording of the media data, switching from one of the communication modes to another one of the communication modes for recording the media data, canceling the recording of the media data, generating and displaying multiple options for performing an operation associated with the recorded media data, etc. In an embodiment, the media recording application streams the media data to a server via a network, for example, the internet, as the recording happens, or at predefined time intervals after initiation of the recording of the media data, or after completion of the recording of the media data.

Also, disclosed herein is a computer implemented method and system for recording audio data in one or more of multiple communication modes based on one or more gestures on the GUI of the electronic device. As used herein, the term "audio data" refers to a stored form of one or more sounds produced and recorded for the purpose of audibly listening to a reproduction of those sounds. The audio data comprises, for example, analog and digitally coded sound, music, a musical composition, a song, live speech, broadcasted speech, voice information, etc., that can be stored, for example, as an audio clip, an audio message, etc., or in any digital format. In an embodiment, the gesture based media recording application disclosed above is configured as a gesture based audio recording application, hereafter referred to as an "audio recording application". The audio recording application defines multiple interface regions on the GUI and detects a gesture on one of the defined interface regions. The audio recording application performs a first action associated with the recording of the audio data in one of the communication modes on detection of a gesture on one of the defined interface regions. For example, the audio recording application triggers recording of the audio data in one of the communication modes on detection of a gesture on one of the defined interface regions.

The audio recording application detects another gesture on the same or another one of the defined interface regions. The audio recording application then performs another action in response to the detection of the other gesture on the same or the other defined interface region. The action performed by the audio recording application comprises, for example, switching from one of the communication modes to another one of the communication modes for recording the audio data in the other communication mode, canceling the recording of the audio data in one of the communication modes, generating and displaying multiple options for performing an operation associated with the recorded audio data, etc. In an embodiment, the audio recording application streams the audio data to the server via the network either continuously while recording the audio data, or at predefined time intervals after initiation of the recording of the audio data, or after completion of the recording of the audio data.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1:
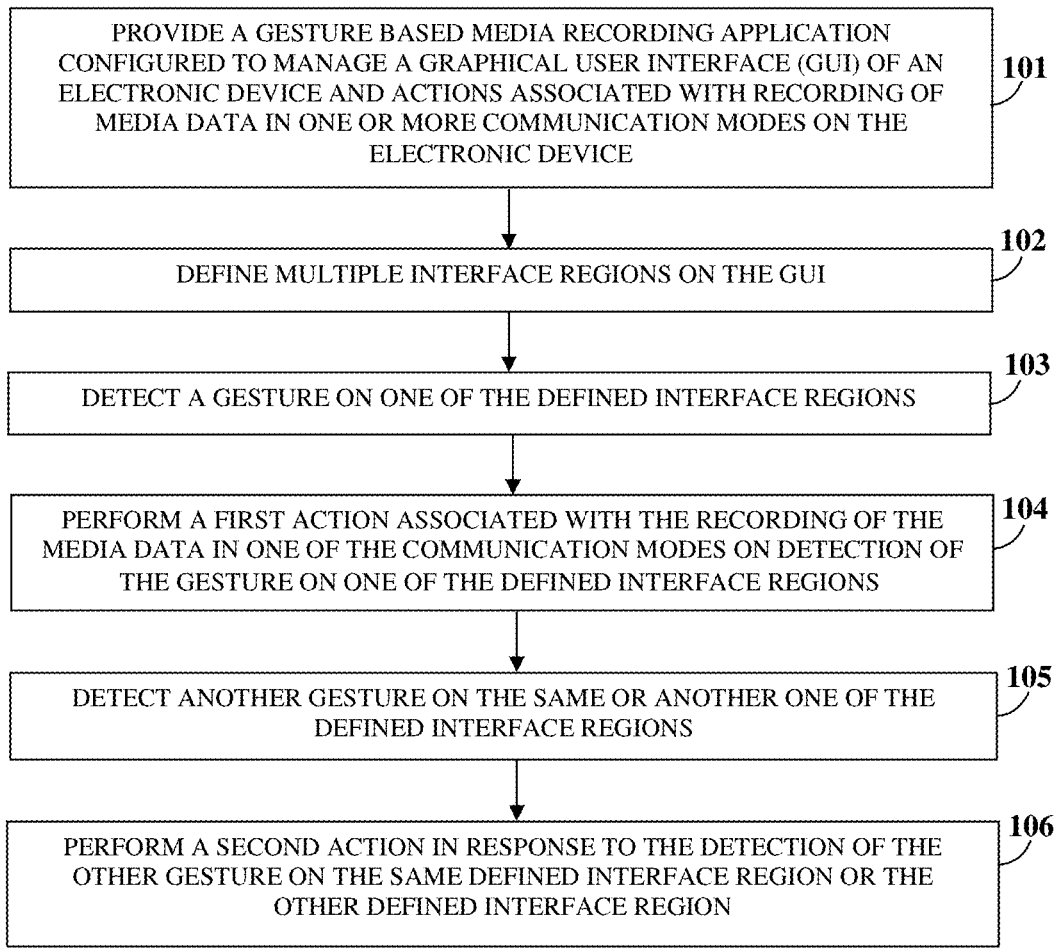
FIG. 1 illustrates a computer implemented method for recording media data in one or more of multiple communication modes based on one or more gestures on a graphical user interface of an electronic device.

FIG. 1 illustrates a computer implemented method for recording media data in one or more of multiple communication modes based on one or more gestures on a graphical user interface (GUI) of an electronic device. As used herein, the term "media data" refers to a stored form of media, for example, sounds, images, videos, etc., produced and recorded for the purpose of audibly listening to a reproduction of those sounds or for the purpose of viewing a reproduction of those images, videos, etc. The media data comprises, for example, audio data such as analog and digitally coded sound, music, a musical composition, a song, live speech, broadcasted speech, voice information, etc., that can be stored, for example, as an audio clip, an audio message, etc., or in any digital format, or video data such as still images, moving images, graphics, animations, live video, broadcasted video, video information, interactivity content forms, rich media, etc., that can be stored, for example, as a video clip, a video message, etc., or in any digital format, or audiovisual data, or image data, or multimedia data, etc., or any combination thereof. The media data can be stored, for example, as a media clip, a media message, etc., or in any digital format. The electronic device may be used for transmitting the recorded media data to another electronic device via a network, for example, a mobile communication network. Also, as used herein, the term "media message" refers to a message that can be recorded on a user's electronic device, for example, a cellular phone, a smart phone, a tablet computing device, an Ultrabook®, a laptop, a personal digital assistant, a touch centric device, a digital camera, a television, a car, a gaming console, etc., or any other mobile device configured for communication. The media message is, for example, an audio message, or a video message, or an audiovisual message, or a picture message, or a multimedia message, etc., or any combination thereof.

Also, as used herein, the term "communication mode" refers to a mode for initiating, continuing, and/or terminating recording of media data on an electronic device. The communication mode can be, for example, a push to talk (PTT) communication mode, a tap to start (TTS) communication mode, a release to record (RTR) communication mode, a release to stop (RTS) communication mode, a tap to end (TTE) communication mode, etc. Also, as used herein, the term "gesture" refers to a user action or an actuation by a user performed manually, for example, by use of a finger, a thumb, a hand, etc., on the GUI, or by using an input device, for example, a physical button, a computer mouse, a pointing device, a light pen, a touch pad, a touch sensitive display device, a track ball, a pointing stick, any device capable of sensing a tactile input, etc. The gestures comprise, for example, a drag and drop gesture, a click gesture, a double click gesture, a click and hold gesture, a tap gesture, a tap and hold gesture, a hold and swipe gesture, a touch gesture, a slide gesture, a glide gesture, a scrolling gesture, etc., or any combination thereof.

In the push to talk communication mode, a user is expected to engage an interface element for the entire duration of recording of the media data. That is, the recording initiates as soon as the user activates an interface element and terminates only when the user releases the interface element. As used herein, the term "interface element" refers to any software or hardware implemented switch or button, for example, a physical push button, a touch button or a tactile button, a screen icon type touch button, a wheel, a touch pad, etc., capable of receiving an input from a user or capturing an application of pressure from the user. In the tap to start communication mode, the user is expected to activate the interface element for a short time, which initiates the recording of the media data, then release the interface element, then speak, and then activate the interface element a second time to terminate the recording of the media data. In the release to record communication mode, after activation of the interface element, which initiates the recording of the media data, the user can either keep the interface element activated while recording or can release the interface element to continue recording. In the release to stop communication mode, the user can either keep the interface element activated to continue recording or can release the interface element to stop or terminate the recording. In the tap to end communication mode, the user is expected to activate or tap the interface element to terminate recording of the media data.

The computer implemented method disclosed herein provides 101 a gesture based media recording application, hereafter referred to as a "media recording application", executable by at least one processor configured to manage the GUI of the electronic device and actions associated with the recording of the media data in one or more communication modes on the electronic device. The media recording application manages any action associated with the recording of the media data regardless of how the recording of the media data is initiated. Once the user initiates recording the media data through any method, the media recording application enables the user to change the mode of recording or perform any operation on the media data. In addition to triggering of recording of the media data, the media recording application manages switching of the communication mode or cancelation of the recording, for example, in a push to talk communication mode or a tap to start communication mode. The media recording application defines 102 multiple interface regions on the GUI of the electronic device. As used herein, the term "interface region" refers to an area provided on the GUI of the electronic device that enables interfacing and interactions with a user of the electronic device. The interface regions on the GUI comprise, for example, software implemented icons, buttons, switches, sliders, menus, menu items, etc., on the GUI. In an embodiment, the interface regions are defined by an application designer during application development. For example, the application designer defines a button, a switch, a slider, etc., by an image on a screen or the GUI.

The media recording application dynamically or statistically associates a predefined function from a set of predefined functions with each of the defined interface regions on the GUI. The predefined functions are tasks or a series of tasks executed by the electronic device. For example, the predefined functions comprise recording media data using a push to talk communication mode, recording media data using a tap to start communication mode, recording media data using a release to record communication mode, stopping or terminating recording of the media data using a release to stop communication mode or a tap to end communication mode, streaming the media data to a server via a network during or after the recording process, or at predefined intervals after initiation of the recording process, canceling a media recording, launching a program stored on the electronic device, initializing a peripheral device on the electronic device, sending out requests to a network resource, changing a GUI configuration, etc.

In an embodiment, the media recording application dynamically changes the predefined function associated with one of the defined interface regions to another one of the predefined functions based on the active communication mode and user preferences. The media recording application dynamically changes the predefined functions, for example, by analyzing the frequently used predefined functions, tracking the sequence of events up to the current state, providing a settings menu for the user to manually select the predefined functions that the user prefers, etc. For example, if the predefined function associated with one of the defined interface regions is "record media data using a push to talk communication mode", after the media recording application detects a gesture on that defined interface region, the media recording application dynamically changes the predefined function of that defined interface region to "stop recording the media data" using a "release and stop" indicator on that defined interface region, or to "send the recorded media data to a recipient" using a "release and send" indicator on that defined interface region, to indicate that the user can complete the recording by lifting his/her finger. In an embodiment, the media recording application allows a user to configure the predefined functions for one or more defined interface regions based on the user's preferences, for example, to cancel the recording, push to talk, release to record, release to stop, switch the recording mode, add an effect, etc.

In an example, if a user's first gesture is a tap gesture on an interface region defined and marked by an icon on the GUI of the user's electronic device, the media recording application launches a program. If a user performs a press and a hold gesture on the interface region, the media recording application changes the predefined function associated with each of the defined interface regions in the neighborhood of the icon. The change in the predefined function may be based on the communication modes and user preferences. The change in the predefined function provides the user with various options related to the launched program. A second gesture on the same interface region or on any one of the defined interface regions in the neighborhood of the same interface region where the first gesture was detected by the user causes another action to take place.

In the method disclosed herein, the media recording application detects 103 a gesture on one of the defined interface regions. The media recording application performs 104 a first action associated with the recording of the media data in one of the communication modes on detection of the first gesture on one of the defined interface regions. The media recording application then detects 105 another gesture on the same defined interface region or on another one of the defined interface regions, after detection of the first gesture. The other gesture may be the same as the first gesture or a different gesture. The media recording application performs 106 a second action in response to the detection of the other gesture on the same defined interface region or the other defined interface region. In an embodiment, the second action is the same as the first action. In another embodiment, the second action is different from the first action. The first action and the second action performed by the media recording application in response to the detection of the gestures comprise at least one of, for example, triggering recording of the media data, switching from one communication mode to another communication mode for recording the media data, canceling the recording of the media data as disclosed in the detailed description of FIGS. 3A-3D and FIGS. 4A-4D, or generating and displaying multiple options for performing an operation associated with the recorded media data as disclosed in the detailed description of FIG. 7. The options comprise, for example, saving the recorded media data without sending, saving the recorded media data as a draft for a future use of the recorded media data, saving the recorded media data for sending the recorded media data to another electronic device, deleting the recorded media data, etc. The media recording application detects multiple gestures on different interface regions on the GUI and accordingly performs the predefined functions associated with the interface regions and, in an embodiment, dynamically changes the associated predefined functions.

In an embodiment, the media recording application streams the media data to a server via a network, for example, the internet, a mobile communication network, etc., as the media data is being recorded. For example, during a live recording, the media recording application streams the media data to the server while the recording is going on. In another embodiment, the media recording application transfers the media data during the recording of the media data to a server via the network at predefined time intervals after initiation of the recording of the media data. For example, during a live recording, the media recording application first records the media data for about 3 seconds into a file and then transfers the recorded media data to the server via the network while still continuing to record. The media recording application then streams the next 3 seconds of the recorded media data to the server, and so on, until the completion of the live recording. In another embodiment, the media recording application records the entire media data locally, and then transmits a completely recorded media data file to the server via the network.

For purposes of illustration, the detailed description refers to recording of audio data; however the scope of the computer implemented method and system disclosed herein is not limited to recording of audio data but may be extended to include recording of video data, for example, in the form of a video message or a video clip, audiovisual data, image data, multimedia data, etc., or any combination thereof.

Figure 2A:
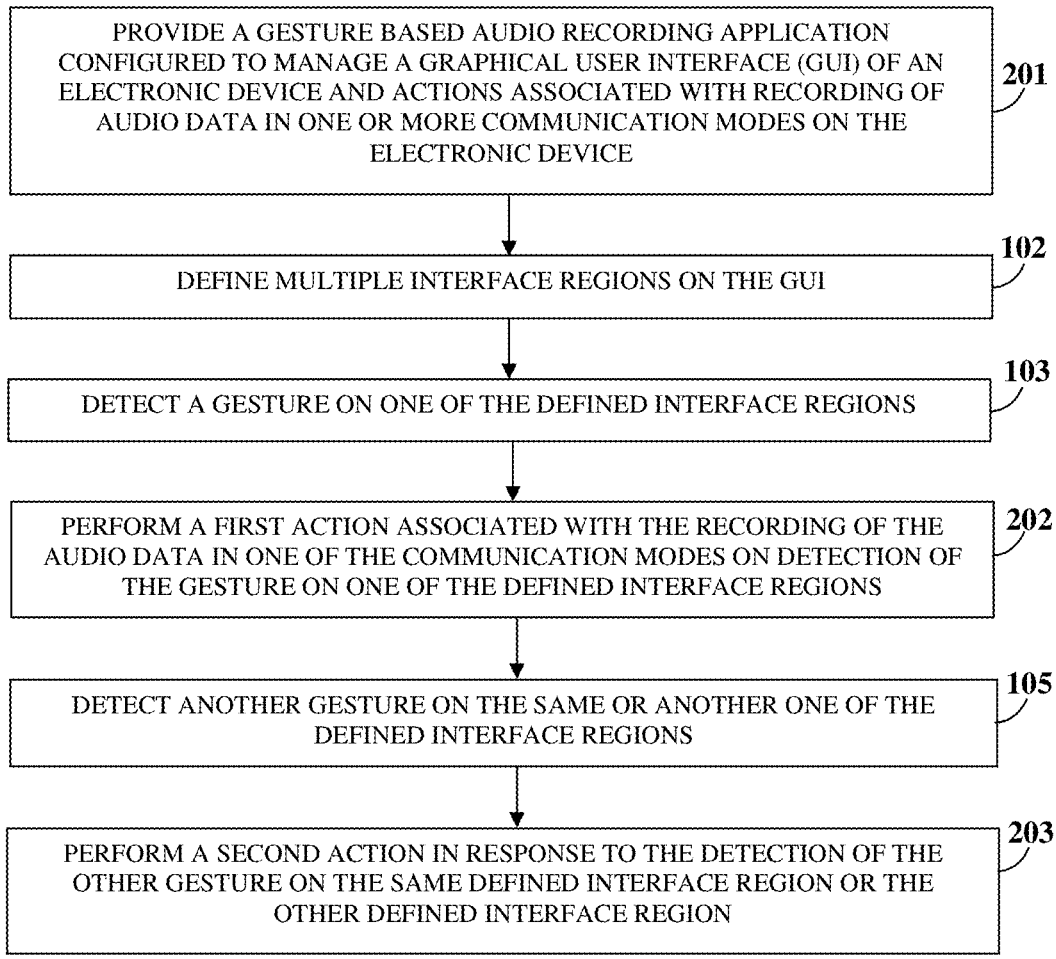
FIG. 2A illustrates a computer implemented method for recording audio data in one or more of multiple communication modes based on one or more gestures on a graphical user interface of an electronic device.

FIG. 2A illustrates a computer implemented method for recording audio data in one or more of multiple communication modes based on one or more gestures on a graphical user interface (GUI) of an electronic device. In an embodiment, the gesture based media recording application disclosed in the detailed description of FIG. 1, is configured as a gesture based audio recording application, herein referred to as an "audio recording application". The computer implemented method disclosed herein provides 201 the audio recording application executable by at least one processor configured to manage the GUI of the electronic device and actions associated with the recording of audio data in one or more of the communication modes on the electronic device. As used herein, the term "audio data" refers to a stored form of one or more sounds produced and recorded for the purpose of audibly listening to a reproduction of those sounds. The audio data comprises, for example, analog and digitally coded sound, music, a musical composition, a song, live speech, broadcasted speech, voice information, etc., that can be stored, for example, as an audio clip, an audio message, etc., or in any digital format.

The audio recording application defines 102 multiple interface regions on the GUI of the electronic device and associates a predefined function from multiple predefined functions with each of the defined interface regions on the GUI. The audio recording application detects 103 a gesture on one of the defined interface regions. The audio recording application performs 202 a first action associated with the recording of the audio data in one of the communication modes on detection of the first gesture on one of the defined interface regions. The audio recording application then detects 105 another gesture on the same defined interface region or on another one of the defined interface regions, after detection of the first gesture. The audio recording application performs 203 a second action in response to the detection of the other gesture on the same defined interface region or on the other defined interface region. In an embodiment, the second action is the same as the first action. In another embodiment, the second action is different from the first action. The first action and the second action performed by the audio recording application in response to the detection of the gestures comprise, for example, triggering recording of the audio data, switching from one communication mode to another communication mode for recording the audio data, canceling the recording of the audio data as disclosed in the detailed description of FIGS. 3A-3D and FIGS. 4A-4D, or generating and displaying multiple options for performing an operation associated with the recorded audio data as disclosed in the detailed description of FIG. 7. The audio recording application dynamically changes and configures the predefined functions associated with the defined interface regions on the GUI based on one or more of the communication modes and user preferences as disclosed in the detailed description of FIG. 1. In an embodiment, the audio recording application streams the audio data to the server via the network continuously while recording the audio data, or at predefined time intervals after initiation of the recording of the audio data, or after completion of the recording of the audio data.

Figure 2B:
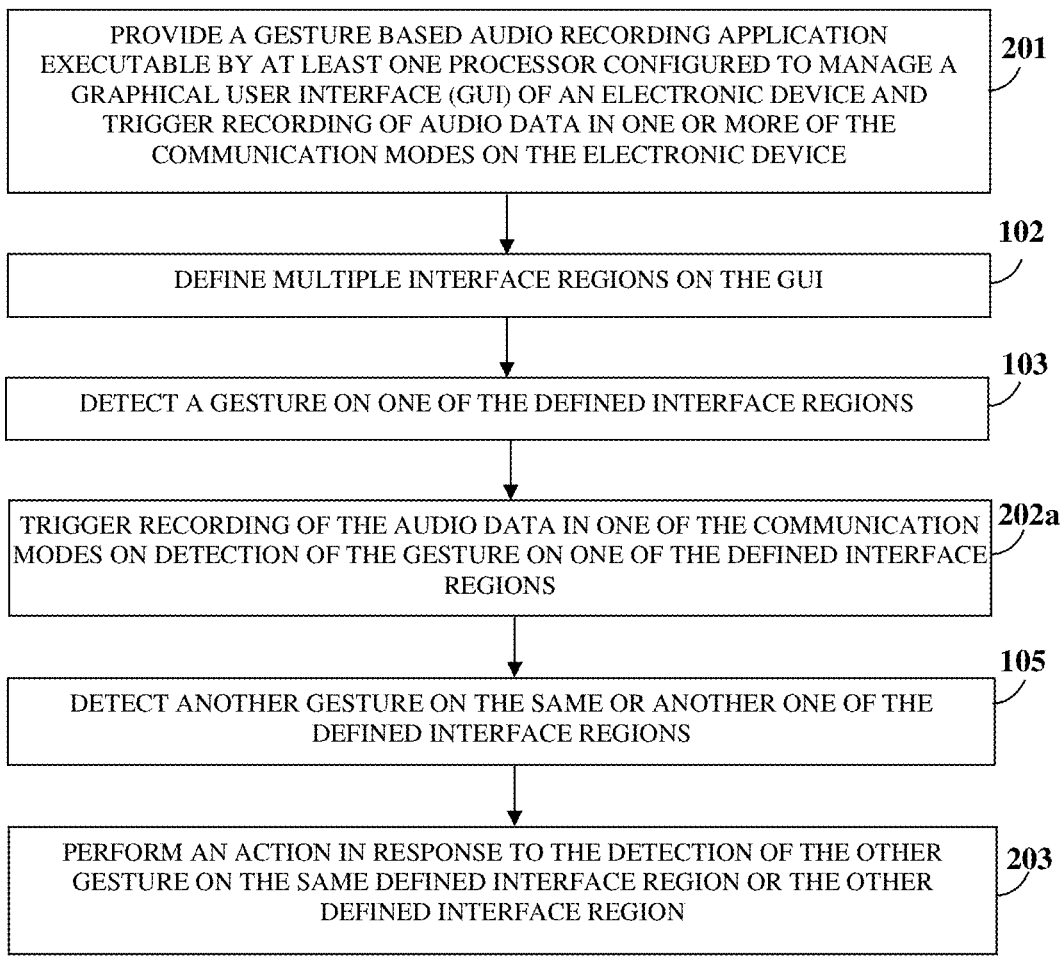
FIG. 2B illustrates an embodiment of the computer implemented method for recording audio data in one or more of multiple communication modes based on one or more gestures on a graphical user interface of an electronic device.
Figure 3A:
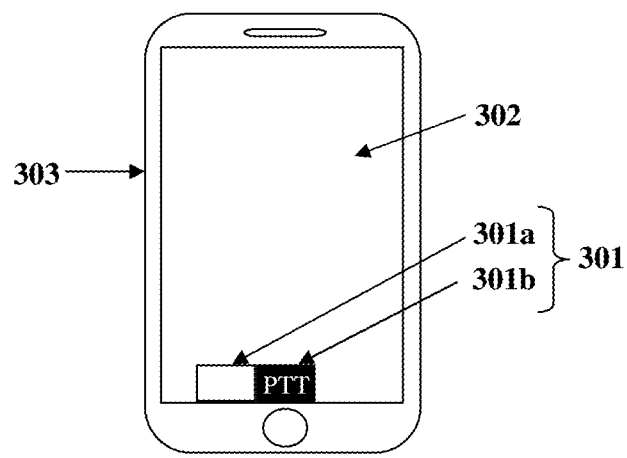
FIGS. 3A-3D exemplarily illustrate two interface regions defined on a graphical user interface of an electronic device and associated with predefined functions.
Figure 3B:
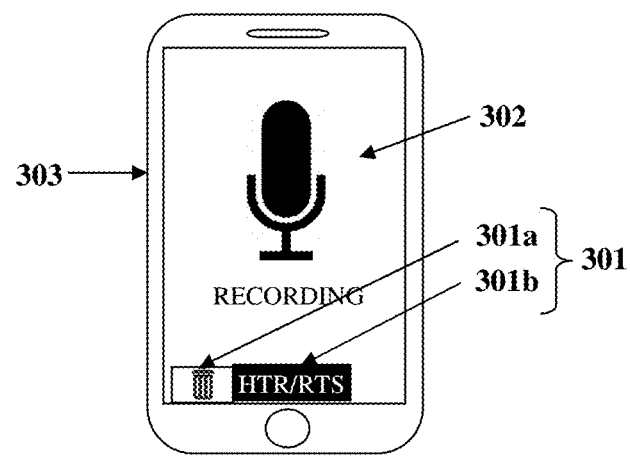
Figure 3C:
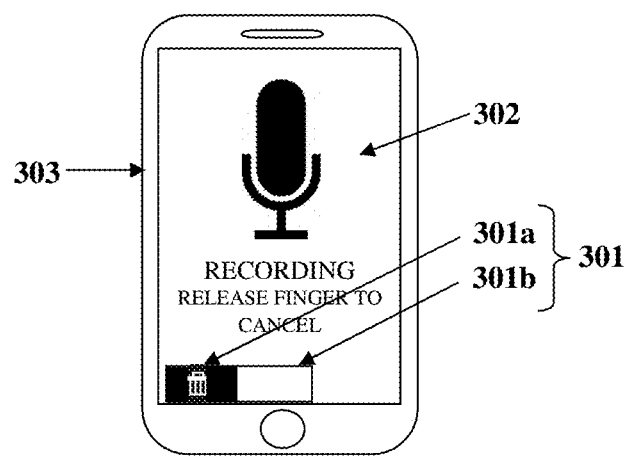
Figure 3D:
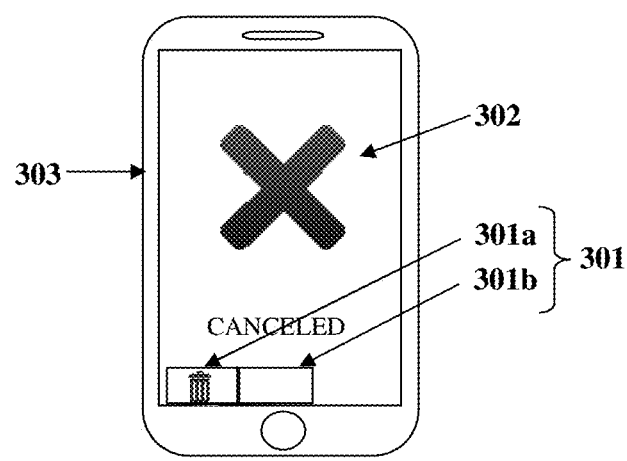
Figure 4A:
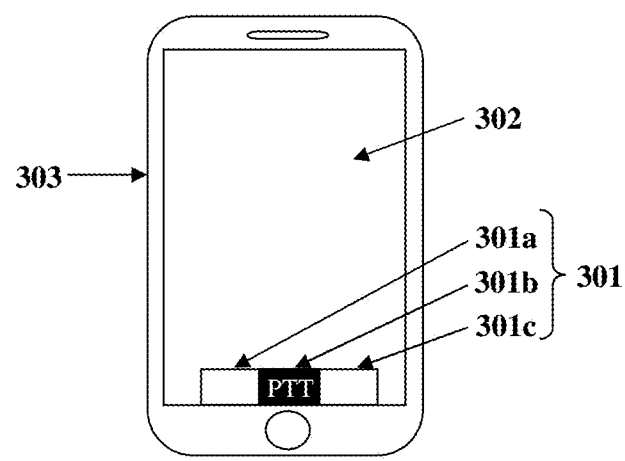
FIGS. 4A-4D exemplarily illustrate three interface regions defined on a graphical user interface of an electronic device and associated with predefined functions.
Figure 4B:
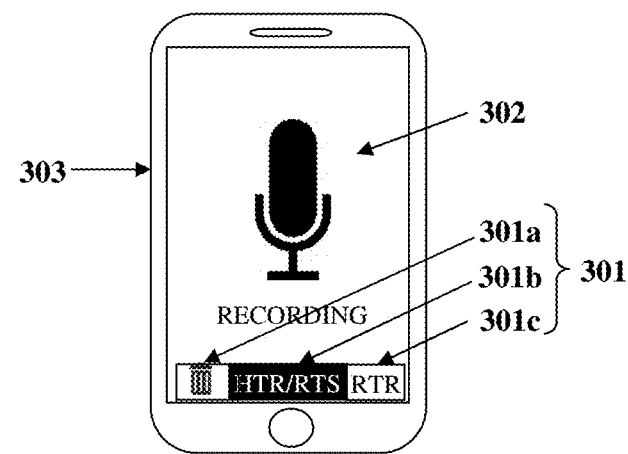
Figure 4C:
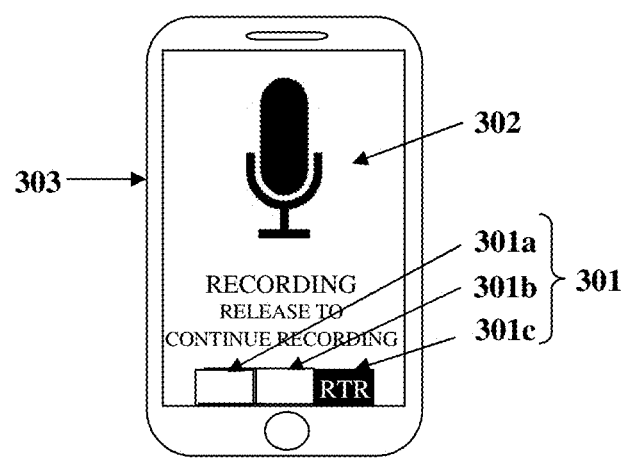
Figure 4D:
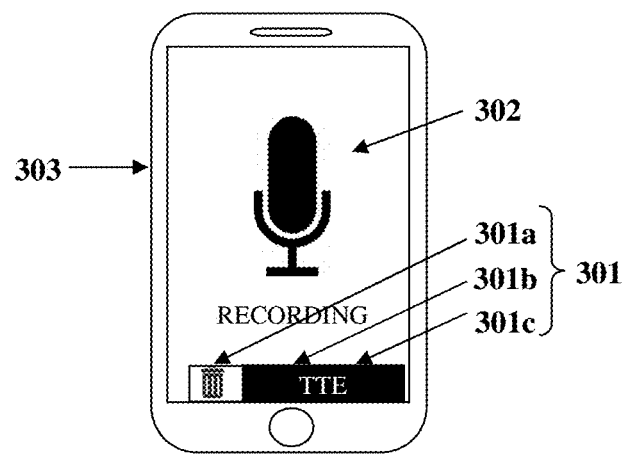

FIG. 2B illustrates an embodiment of the computer implemented method for recording audio data in one or more of multiple communication modes based on one or more gestures on a graphical user interface (GUI) of an electronic device. The computer implemented method comprises the steps 201, 102, and 103 as disclosed in the detailed description of FIG. 2A. In this embodiment, the audio recording application triggers 202a recording of the audio data in one of the communication modes on detection of the first gesture on one of the defined interface regions. The audio recording application detects 105 another gesture on the same defined interface region or on another defined interface region and performs 203 an action in response to the detection of the other gesture on the same defined interface region or the other defined interface region. The action performed by the audio recording application in response to the detection of the other gesture comprises, for example, switching from one communication mode to another communication mode for recording the audio data in the other communication mode, canceling the recording of the audio data in one of the communication modes, or generating and displaying multiple options for performing an operation associated with the recorded audio data.

FIGS. 3A-3D exemplarily illustrate two interface regions 301 defined on a graphical user interface (GUI) 302 of an electronic device 303 and associated with predefined functions. The electronic device 303 is, for example, a mobile communication device with a touch sensitive display. The electronic device 303 is capable of recording and storing media data, for example, audio data. In this example, the communication mode for recording the audio data is, for example, a push to talk (PTT) communication mode. In the push to talk communication mode, a user is expected to press and hold an interface region 301b of the mobile electronic device 303 for recording the audio data. The recording of the audio data continues as long as the interface region 301b is held. The media recording application configured as an audio recording application allows the user to perform an action, for example, cancel the audio data being recorded, delete the recorded audio data, change the communication mode for recording the audio data, save the recorded audio data as a draft, etc., without having to go through various dialogs and/or menus to perform an action after and/or during recording of the audio data. The audio recording application provides the user with the flexibility to switch between the communication modes while the audio data is being recorded, cancel the recording of the audio data, and/or generate and display multiple options for performing an operation associated with the recorded audio data.

Consider an example where a user wishes to cancel recording of audio data on the mobile electronic device 303. The audio recording application defines interface regions 301 on the GUI 302 as exemplarily illustrated in FIGS. 3A-3D. The audio recording application dynamically associates a predefined function of recording the audio data using the push to talk (PTT) communication mode to the defined interface region 301b as exemplarily illustrated in FIG. 3A. Initially, the defined interface region 301a is associated with a null function or has the same predefined function as that of the defined interface region 301b. In an example, the user performs a press and hold gesture on the interface region 301b. The audio recording application detects the user's press and hold gesture on the interface region 301b. In response to the detection of the press and hold gesture on the interface region 301b, the audio recording application triggers recording of the audio data. At this point, the audio recording application associates a new predefined function to the interface regions 301a and 301b as exemplarily illustrated in FIG. 3B. The new predefined function associated with the interface region 301a is to cancel and delete the current audio data that is being recorded. The audio recording application changes the predefined function associated with the interface region 301b to, for example, "hold to record (HTR)/release to stop (RTS)", indicating that the user needs to continue holding the interface region 301b for recording the audio data and can release the interface region 301b to stop recording and save the recorded audio data.

In this example, the user then performs a slide gesture on the GUI 302. That is, the user drags or slides his/her finger on the GUI 302 from the interface region 301b to the interface region 301a. The audio recording application detects the user's slide gesture on the GUI 302 and highlights the interface region 301a as exemplarily illustrated in FIG. 3C. When the user lifts or releases his/her finger from the interface region 301a, the audio recording application detects the user's release gesture on the GUI 302. In response to the detection of the release gesture, the audio recording application executes the predefined function associated with the interface region 301a where the release gesture was detected. Since the predefined function that was newly associated with the interface region 301a is to cancel and delete the recorded audio data which is currently being recorded, the audio recording application executes this predefined function and cancels the recorded audio data as exemplarily illustrated in FIG. 3D. Therefore, the audio recording application allows a user to cancel the recording being made by the user under the push to talk (PTT) communication mode, without being forced to go through another interaction with the GUI 302.

FIGS. 4A-4D exemplarily illustrate three interface regions 301 defined on a graphical user interface (GUI) 302 of an electronic device 303 and associated with predefined functions. The electronic device 303 is, for example, a mobile communication device with a touch sensitive display. The electronic device 303 is capable of recording and storing media data, for example, audio data. In this example, the communication modes for recording the audio data are, for example, a push to talk (PTT) communication mode, a release to record (RTR) communication mode, and a tap to end (TTE) communication mode. The PTT communication mode is disclosed in the detailed description of FIGS. 3A-3D. The RTR communication mode is convenient for recording lengthy audio data. FIGS. 4A-4D exemplarily illustrate switching from the PTT communication mode to the RTR communication mode for recording the audio data.

Consider an example where a user wishes to switch from the push to talk (PTT) communication mode to the release to record (RTR) communication mode to avoid having to continually press the interface region 301b for recording lengthy audio data. The media recording application configured as an audio recording application defines interface regions 301a, 301b, and 301c on the GUI 302 as exemplarily illustrated in FIGS. 4A-4D. The audio recording application dynamically associates the predefined function of recording the audio data in the PTT communication mode to the interface region 301b as exemplarily illustrated in FIG. 4A. Initially, the interface regions 301a and 301c are associated with a null function or have a similar predefined function as that of the defined interface region 301b.

In an example, the user performs a press and hold gesture on the interface region 301b. The audio recording application detects the press and hold gesture on the interface region 301b. In response to the detection of the press and hold gesture, the audio recording application triggers recording of the audio data and simultaneously associates new predefined functions to the interface regions 301a, 301b, and 301c as exemplarily illustrated in FIG. 4B. The new predefined function associated with the interface region 301b is "hold to record (HTR)/release to stop (RTS)", indicating that the user needs to continue holding the interface region 301b for recording the audio data and can release the button to stop recording or save the recorded audio data. The new predefined function associated with the interface region 301a is to cancel and delete the current audio data which is being recorded. The new predefined function assigned to the interface region 301c is to record the current audio data in the release to record (RTR) communication mode. Although the user initiated the recording of the audio data in the push to talk (PTT) communication mode by pressing and holding the interface region 301b, the user realizes that the recording will be lengthy, and wishes to continue recording without continually pressing the interface region 301b.

The user performs a slide gesture on the GUI 302 to switch from the push to talk (PTT) communication mode to the release to record (RTR) communication mode. That is, the user slides his/her finger on the GUI 302 from the interface region 301b to the interface region 301c. The audio recording application detects the user's slide gesture on the GUI 302 and highlights the interface region 301c as exemplarily illustrated in FIG. 4C. When the user releases his/her finger from the interface region 301c, the audio recording application detects the user's release gesture on the GUI 302. In response to the detection of the release gesture, the audio recording application executes the predefined function associated with the interface region 301c where the release gesture was detected. Since the predefined function that was newly associated with the interface region 301c is to continue recording the audio data in the RTR communication mode, the audio recording application executes this predefined function and continues recording the audio data in the RTR communication mode. In response to the slide and release gesture on the interface region 301c, the audio recording application dynamically associates a new predefined function indicated by "tap to end (TTE)" with the interface regions 301b and 301c as exemplarily illustrated in FIG. 4D. The user can terminate the recording of the audio data by tapping on the interface region 301b or 301c. Adding an option to switch the communication mode from the PTT communication mode to the RTR communication mode is useful if the user realizes that he/she is getting tired of holding a button midway through recording of the audio data.

After the user switches from the push to talk (PTT) communication mode to the release to record (RTR) communication mode, the user may further also cancel recording the audio data in the RTR communication mode by touching the interface region 301a. In response to the detection of the touch gesture on the interface region 301a, the audio recording application executes the predefined function associated with the interface region 301a where the touch gesture was detected. Since the predefined function that was newly associated with the interface region 301a is to cancel and delete the recorded audio data that is currently being recorded, the audio recording application executes this predefined function and cancels the recorded audio data. In another example, the user may also switch from the RTR communication mode to the PTT communication mode by pressing another interface region, for example, 301b associated with the PTT communication mode. Furthermore, the user may initiate recording of the audio data in the RTR communication mode and then switch to the PTT communication mode at any time by pressing the interface region 301b associated with the PTT communication mode on the GUI 302.

Figure 5:
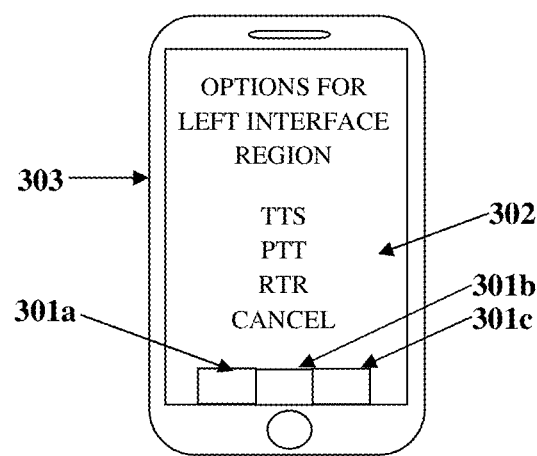
FIG. 5 exemplarily illustrates a list of predefined functions provided by a gesture based media recording application for configuring interface regions on a graphical user interface of an electronic device based on user preferences.

FIG. 5 exemplarily illustrates a list of predefined functions provided by the media recording application for configuring interface regions 301a, 301b, and 301c on a graphical user interface (GUI) 302 of an electronic device 303 based on user preferences. In an embodiment, the media recording application allows a user to configure the predefined functions for one or more defined interface regions 301a, 301b, and 301c based on the user's preferences for performing multiple actions as disclosed in the detailed description of FIG. 1. The predefined functions comprise, for example, tap to start (TTS), push to talk (PTT), release to record (RTR), cancel, etc., as exemplarily illustrated in FIG. 5. The user can choose what predefined function is to be configured with the interface region 301a and the media recording application associates that particular predefined function with that interface region 301a. Similarly, the user can choose the predefined functions that are to be configured with the other interface regions 301b and 301c and the media recording application associates those predefined functions with the respective interface regions 301b and 301c. When the media recording application detects gestures on the interface regions 301a, 301b, and 301c, the media recording application executes the associated predefined functions.

FIGS. 6A-6E exemplarily illustrate three interface regions 301a, 301b, and 301c defined on a graphical user interface (GUI) 302 of an electronic device 303 and associated with predefined functions for performing an action associated with recording of media data. The media recording application defines interface regions 301a, 301b, and 301c on the GUI 302 as exemplarily illustrated in FIGS. 6A-6E. The media recording application dynamically associates the predefined function of recording the media data in the push to talk (PTT) communication mode to the interface region 301b as exemplarily illustrated in FIG. 6A. The media recording application detects a press and hold gesture on the interface region 301b, triggers recording of the media data, and simultaneously associates new predefined functions to the interface regions 301a and 301c as exemplarily illustrated in FIG. 6B. The new predefined function associated with the interface region 301c is a link to view an options menu for performing an operation during the recording of the media data. The options menu comprises options, for example, switching the recording mode, canceling the recording, adding an effect, etc., as exemplarily illustrated in FIG. 6C. The new predefined function associated with the interface region 301a is to cancel and delete the current media data that is being recorded.

Figure 6A:
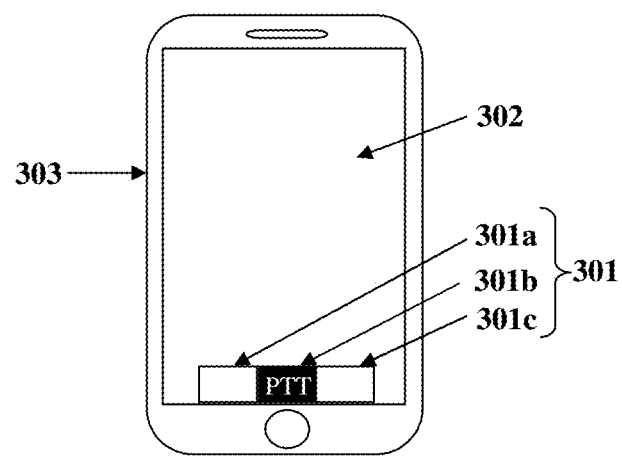
FIGS. 6A-6E exemplarily illustrate three interface regions defined on a graphical user interface of an electronic device and associated with predefined functions for performing an action associated with recording of media data.
Figure 6B:
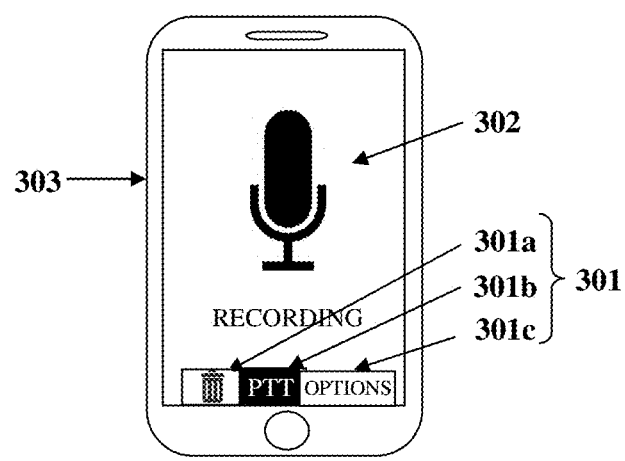
Figure 6C:
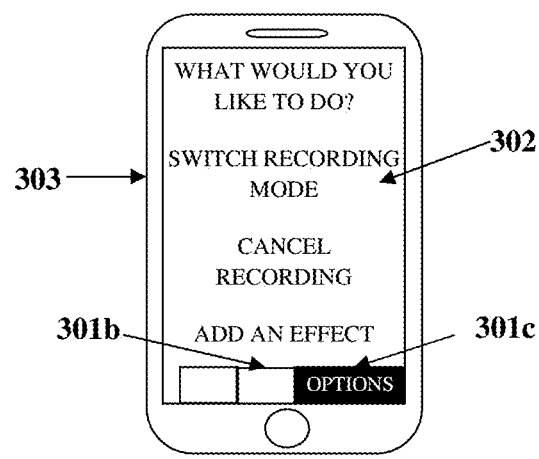
Figure 6D:
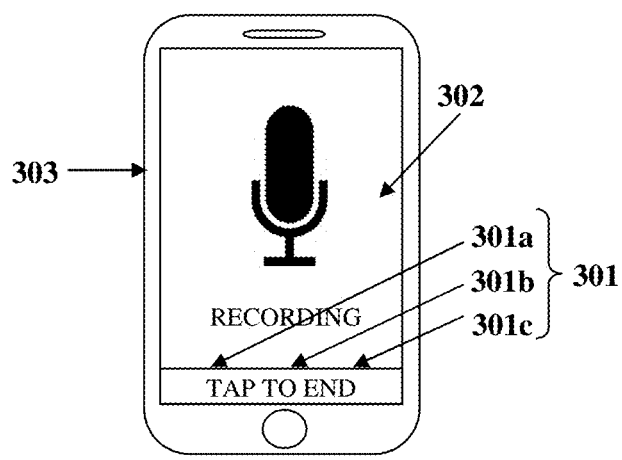
Figure 6E:
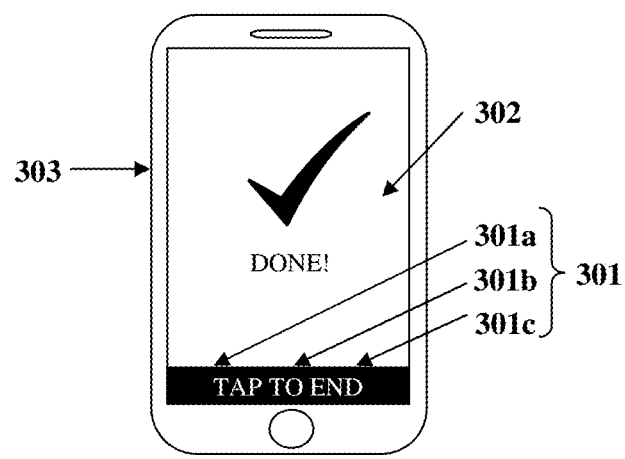

When the user slides his/her finger on the GUI 302 from the interface region 301b to the interface region 301c, the media recording application detects the slide gesture on the GUI 302 and highlights the interface region 301c as exemplarily illustrated in FIG. 6C. In response to the detection of the slide gesture, the media recording application displays the options menu to the user for selecting an action associated with the recording. The user can switch the recording mode, cancel the recording, or add an effect to the media data by selecting one of the options displayed on the GUI 302. Once the option is selected, the media recording application associates another predefined function to the interface regions 301a, 301b, and 301c depending on the selected option. For example, the media recording application associates another predefined function indicated by "tap to end (TTE)" with the interface regions 301a, 301b, and 301c to allow the user to terminate the recording of the media data. If the user selects the option, for example, "switch recording mode" from the options menu, the media recording application switches the communication mode from the push to talk (PTT) communication mode to the TTE communication mode. The media recording application continues recording of the media data in the TTE communication mode as exemplarily illustrated in FIG. 6D. The user can then tap on any of the interface regions 301a, 301b, and 301c to stop the recording as exemplarily illustrated in FIG. 6E.

Figure 7:
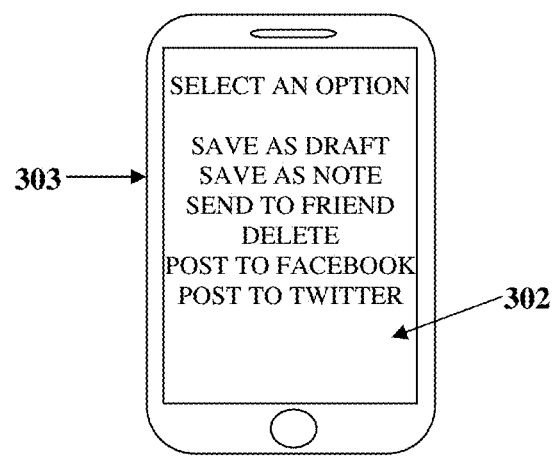
FIG. 7 exemplarily illustrates multiple options provided by the gesture based media recording application for performing an action associated with recorded media data.

FIG. 7 exemplarily illustrates multiple options provided by the media recording application for performing an action associated with recorded media data. The media recording application generates and displays multiple options for performing operations associated with the recorded media data. The options comprise, for example, save the recorded media data as a note, save the recorded media data as a draft for a future use of the recorded media data, save the recorded media data for sending the recorded media data to another electronic device, send the recorded media data to a friend or another user, delete the recorded media data, post the recorded media data on Facebook® of Facebook, Inc., post the recorded media data on Twitter® of Twitter, Inc., post the recorded media data on other social networking platforms, etc.

Figure 8:
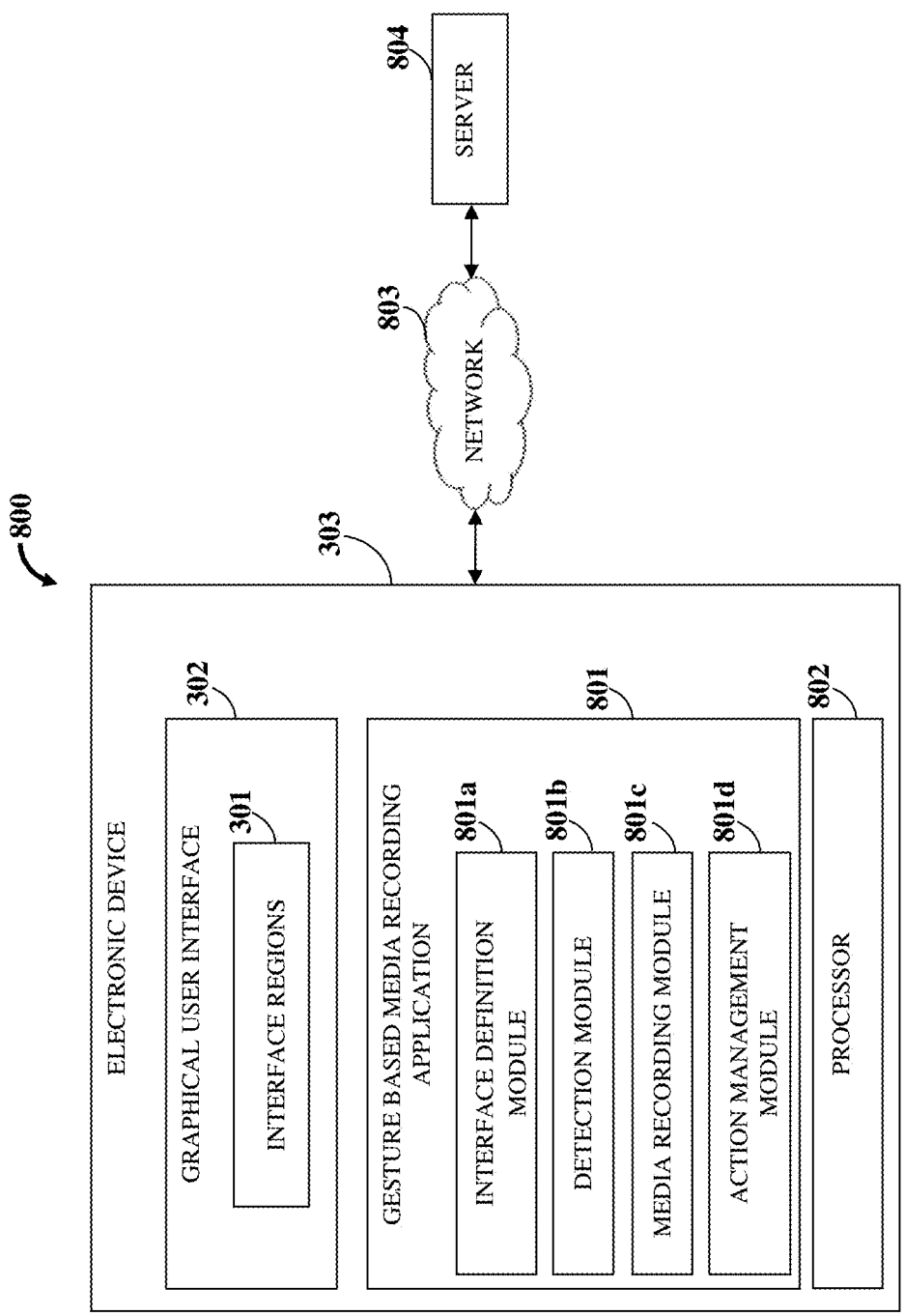
FIG. 8 illustrates a computer implemented system for recording media data in one or more of multiple communication modes based on one or more gestures on a graphical user interface of an electronic device.

FIG. 8 illustrates a computer implemented system 800 for recording media data in one or more of multiple communication modes based on one or more gestures on a graphical user interface (GUI) 302 of an electronic device 303. The communication modes comprise, for example, a push to talk communication mode, a tap to start communication mode, a release to record communication mode, a release to stop communication mode, a tap to end communication mode, etc. The electronic device 303 is, for example, a cellular phone, a smart phone, a tablet computing device, a laptop, a personal digital assistant, a touch centric device, a digital camera, a television, a car, a gaming console, etc., or any other electronic device configured for communication. The computer implemented system 800, also referred to as a "multi-gesture media recording system", comprises the media recording application 801 deployed on a user's electronic device 303. In an embodiment, the media recording application 801 is configured as an audio recording application configured to manage the GUI 302 of the electronic device 303 and actions associated with recording of audio data in one or more of the communication modes on the electronic device 303. The computer implemented system 800 disclosed herein further comprises at least one processor 802 and a non-transitory computer readable storage medium communicatively coupled to the processor 802. The processor 802 is configured to execute modules 801*a*, 801*b*, 801*c*, 801*d*, etc., of the media recording application 801. The non-transitory computer readable storage medium is configured to store the modules 801*a*, 801*b*, 801*c*, 801*d*, etc., of the media recording application 801.

The media recording application 801 manages the GUI 302 of the electronic device 303 and actions associated with the recording of the media data in one or more communication modes on the electronic device 303. The media recording application 801 comprises an interface definition module 801*a*, a detection module 801*b*, a media recording module 801*c*, and an action management module 801*d*. The interface definition module 801*a* defines multiple interface regions 301 on the GUI 302 of the electronic device 303 as exemplarily illustrated in FIGS. 3A-3D, FIGS. 4A-4D, and FIGS. 6A-6E. The interface definition module 801*a* further associates a predefined function from multiple predefined functions with each of the defined interface regions 301 on the GUI 302 as disclosed in the detailed description of FIGS. 3A-3D and FIGS. 4A-4D. The interface definition module 801*a* also dynamically changes the predefined function associated with one of the defined interface regions 301 to another one of the predefined functions based on one or more communication modes and user preferences. In an embodiment, the interface definition module 801*a* configures predefined functions for one or more defined interface regions 301 based on the user's preferences as disclosed in the detailed description of FIG. 5.

The detection module 801*b* detects one of multiple gestures, for example, a click and hold gesture, a press and hold gesture, a tap gesture, a tap and hold gesture, a touch gesture, a slide gesture, etc., on one of the defined interface regions 301. The action management module 801*d* performs a first action associated with the recording of the media data in one of the communication modes, on detection of a gesture on one of the defined interface regions 301. The detection module 801*b* further detects another gesture on the same one of the defined interface regions 301 or another one of the defined interface regions 301. The action management module 801*d* performs a second action, in response to the detection of another gesture on the same one of the defined interface regions 301 or another one of the defined interface regions 301. The first action and the second action are at least one of: triggering recording of the media data, switching from one communication mode to another communication mode for recording the media data; canceling the recording of the media data, generating and displaying multiple options for performing an operation associated with the recorded media data, etc.

In an embodiment, the media recording module 801*c* streams the media data to a server 804 via a network 803 continuously while recording the media data, or at predefined time intervals after initiation of the recording of the media data, or after completion of the recording of the media data. For example, the media recording module 801*c* streams audio data to the server 804 via the network 803 continuously while recording the audio data, or at predefined time intervals after initiation of the recording of the audio data, or after completion of the recording of the audio data. The network 803 is, for example, the internet, an intranet, a wireless network, a communication network that implements Bluetooth® of Bluetooth Sig, Inc., a network that implements Wi-Fi® of the Wireless Ethernet Compatibility Alliance, Inc., an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, an internet connection network, an infrared communication network, etc., or a network formed from any combination of these networks.

Figure 9:
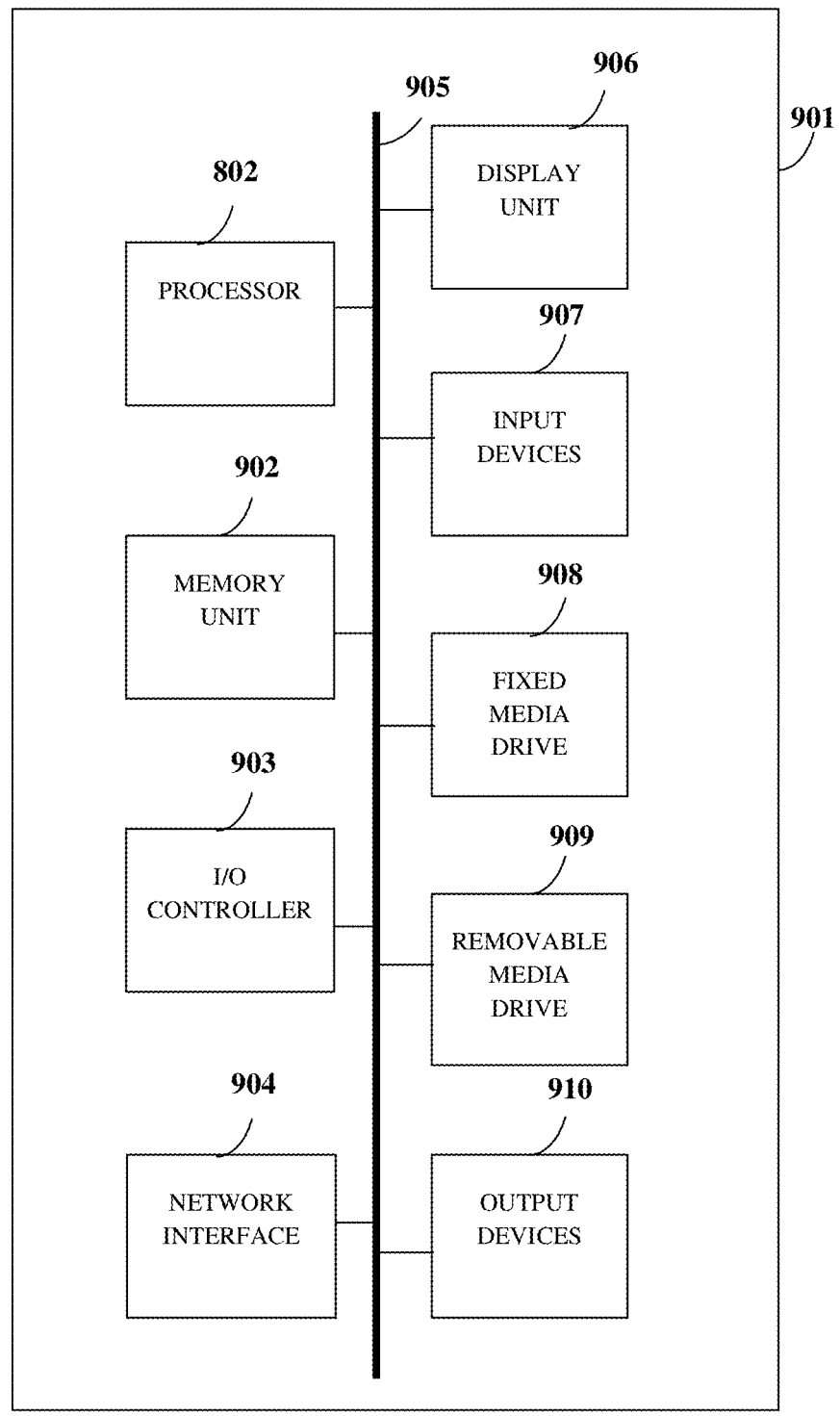
FIG. 9 exemplarily illustrates the architecture of a computer system employed by the gesture based media recording application for managing a graphical user interface of an electronic device and actions associated with recording media data in one or more of multiple communication modes.

FIG. 9 exemplarily illustrates the architecture of a computer system 901 employed by the media recording application 801 for managing a graphical user interface (GUI) 302 of an electronic device 303 and actions associated with recording media data in one or more of multiple communication modes. The media recording application 801 of the computer implemented system 800 exemplarily illustrated in FIG. 8 employs the architecture of the computer system 901 exemplarily illustrated in FIG. 9. The computer system 901 is programmable using a high level computer programming language. The computer system 901 may be implemented using programmed and purposeful hardware. The computer system 901 comprises, for example, a processor 802, a non-transitory computer readable storage medium such as a memory unit 902 for storing programs and data, an input/output (I/O) controller 903, a network interface 904, a data bus 905, a display unit 906, input devices 907, a fixed media drive 908, output devices 910, etc. The computer system 901 may optionally comprise a removable media drive 909 for receiving removable media.

The processor 802 refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 802 may also be implemented as a processor set comprising, for example, a general purpose microprocessor and a math or graphics co-processor. The processor 802 is selected, for example, from the Intel® processors such as the Itanium® microprocessor or the Pentium® processors, Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, etc. The computer implemented system 800 disclosed herein is not limited to a computer system 901 employing a processor 802. The computer system 901 may also employ a controller or a microcontroller.

The memory unit 902 is used for storing programs, applications, and data. For example, the interface definition module 801a, the detection module 801b, the media recording module 801c, and the action management module 801d of the media recording application 801 are stored in the memory unit 902. The memory unit 902 is, for example, a random access memory (RAM) or another type of dynamic storage device that stores information and instructions for execution by the processor 802. The memory unit 902 also stores temporary variables and other intermediate information used during execution of the instructions by the processor 802. The computer system 901 further comprises a read only memory (ROM) or another type of static storage device that stores static information and instructions for the processor 802.

The I/O controller 903 controls input actions and output actions performed by the media recording application 801. The network interface 904 enables connection of the computer system 901 to a network 803, for example, the internet, a mobile communication network, etc. For example, the computer system 901 communicates with other interacting devices, for example, another mobile device (not shown) through the network interface 904. In an embodiment, the network interface 904 is provided as an interface card also referred to as a line card or as a modem. The network interface 904 comprises, for example, one or more of an infrared (IR) interface, an interface implementing Wi-Fi® of the Wireless Ethernet Compatibility Alliance, Inc., a universal serial bus (USB) interface, a FireWire® interface of Apple, Inc., a Bluetooth® interface, an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, and Ethernet communication interfaces, asynchronous transfer mode (ATM) interfaces, a high-speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The data bus 905 permits communications between the GUI 302 and the modules, for example, 801a, 801b, 801c, 801d, etc., of the media recording application 801. The data bus 905 also permits communications between the modules, for example, 801a, 801b, 801c, 801d, etc., of the media recording application 801.

The display unit 906, via the GUI 302, displays information, display interfaces, interactable interface regions 301 exemplarily illustrated in FIGS. 3A-3D, FIGS. 4A-4D, and FIGS. 6A-6E, such as icons, software implemented buttons, sliders, for example, for allowing a user to perform an action, for example, cancel media data being recorded, delete recorded media data, change the communication mode for recording the media data, save the recorded media data as a draft, etc. The display unit 906 comprises, for example, a liquid crystal display, a plasma display, an organic light emitting diode (OLED) based display, etc. The input devices 907 are used for inputting data into the computer system 901. The input devices 907 are, for example, a keyboard such as an alphanumeric keyboard, a microphone, a joystick, a pointing device such as a computer mouse, a touch pad, a light pen, a physical button, a pointing device, a touch sensitive display device, a track ball, a pointing stick, etc. For example, a user inputs a selection of the options for performing an operation associated with the recorded media data, and/or inputs a configuration of the predefined functions for one or more of the defined interface regions 301 on the GUI 302 using the inputs devices 907.

Computer applications and programs are used for operating the computer system 901. In an embodiment, the programs are loaded onto the fixed media drive 908 and into the memory unit 902 of the computer system 901 via the removable media drive 909. In another embodiment, the computer applications and programs may be loaded directly via a network 803, for example, a Wi-Fi® network. Computer applications and programs are executed by double clicking a related icon displayed on the display unit 906 using one of the input devices 907. The output devices 910 output the results of operations performed by the media recording application 801, for example, for viewing by a user of the electronic device 303. For example, the media recording application 801 prompts the user to select an option for performing an operation associated with the recorded media data through a dialog box on an output device 910 such as the display unit 906 of the electronic device 303.

The processor 802 executes an operating system, for example, the Linux® operating system, the Unix® operating system, any version of the Microsoft® Windows® operating system, the Mac OS of Apple Inc., the IBM® OS/2, VxWorks® of Wind River Systems, inc., QNX Neutrino® developed by QNX Software Systems Ltd., the Palm OS®, the Solaris operating system developed by Sun Microsystems, Inc., the Android operating system, the Windows Phone® operating system of Microsoft Corporation, the BlackBerry® operating system of Research in Motion Limited, the iOS operating system of Apple Inc., the Symbian® operating system of Symbian Foundation Limited, etc. The computer system 901 employs the operating system for performing multiple tasks. The operating system is responsible for management and coordination of activities and sharing of resources of the computer system 901. The operating system further manages security of the computer system 901, peripheral devices connected to the computer system 901, and network connections. The operating system employed on the computer system 901 recognizes, for example, inputs provided by the user using one of the input devices 907, the output display, files, and directories stored locally on the fixed media drive 908, for example, a hard drive. The operating system on the computer system 901 executes different programs using the processor 802. The processor 802 and the operating system together define a computer platform for which application programs in high level programming languages are written.

The processor 802 retrieves instructions for executing the modules, for example, 801a, 801b, 801c, 801d, etc., of the media recording application 801 from the memory unit 902. A program counter determines the location of the instructions in the memory unit 902. The program counter stores a number that identifies the current position in the program of each of the modules, for example, 801a, 801b, 801c, 801d, etc., of the media recording application 801. The instructions fetched by the processor 802 from the memory unit 902 after being processed are decoded. The instructions are stored in an instruction register in the processor 802. After processing and decoding, the processor 802 executes the instructions. For example, the interface definition module 801a defines instructions for defining multiple interface regions 301 on the GUI 302 of the electronic device 303. Furthermore, the interface definition module 801a defines instructions for associating a predefined function from multiple predefined functions with each of the defined interface regions 301 on the GUI 302. Furthermore, the interface definition module 801*a* defines instructions for dynamically changing the predefined function associated with one of the defined interface regions 301 to another one of the predefined functions based on one or more communication modes and user preferences. Furthermore, the interface definition module 801*a* defines instructions for configuring predefined functions for one or more defined interface regions 301 based on the user's preferences.

The detection module 801*b* defines instructions for detecting one of multiple gestures on one of the defined interface regions 301. The action management module 801*d* defines instructions for performing a first action associated with the recording of the media data in one of the communication modes, on detection of a gesture on one of the defined interface regions 301. Furthermore, the detection module 801*b* defines instructions for detecting another gesture on the same one of the defined interface regions 301 or another one of the defined interface regions 301. The action management module 801*d* defines instructions for performing a second action, in response to the detection of another gesture on the same one of the defined interface regions 301 or another one of the defined interface regions 301. The media recording module 801*c* defines instructions for streaming the media data to a server 804 via the network 803 continuously while recording the media data, or at predefined time intervals after initiation of the recording of the media data, or after completion of the recording of the media data.

The processor 802 of the computer system 901 employed by the media recording application 801 retrieves the instructions defined by the interface definition module 801*a*, the detection module 801*b*, the media recording module 801*c*, and the action management module 801*d* of the media recording application 801, and executes the instructions, thereby performing one or more processes defined by those instructions. At the time of execution, the instructions stored in the instruction register are examined to determine the operations to be performed. The processor 802 then performs the specified operations. The operations comprise arithmetic operations and logic operations. The operating system performs multiple routines for performing a number of tasks required to assign the input devices 907, the output devices 910, and memory for execution of the modules, for example, 801*a*, 801*b*, 801*c*, 801*d*, etc., of the media recording application 801. The tasks performed by the operating system comprise, for example, assigning memory to the modules, for example, 801*a*, 801*b*, 801*c*, 801*d*, etc., of the media recording application 801, and to data used by the media recording application 801, moving data between the memory unit 902 and disk units, and handling input/output operations. The operating system performs the tasks on request by the operations and after performing the tasks, the operating system transfers the execution control back to the processor 802. The processor 802 continues the execution to obtain one or more outputs. The outputs of the execution of the modules, for example, 801*a*, 801*b*, 801*c*, 801*d*, etc., of the media recording application 801 are displayed on the display unit 906 to the user.

For purposes of illustration, the detailed description refers to the media recording application 801 being run locally on the computer system 901; however the scope of the computer implemented method and system 800 disclosed herein is not limited to the media recording application 801 being run locally on the computer system 901 via the operating system and the processor 802, but may be extended to run remotely over the network 803 by employing a web browser and a remote server, a mobile phone, or other electronic devices. One or more portions of the computer system 901 may be distributed across one or more computer systems (not shown) coupled to the network 803.

Disclosed herein is also a computer program product comprising a non-transitory computer readable storage medium that stores computer program codes comprising instructions executable by at least one processor 802 for recording media data in one or more communication modes based on one or more gestures on the GUI 302 of the electronic device 303. As used herein, the term "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor 802, except for a transitory, propagating signal.

The computer program product disclosed herein comprises a first computer program code for defining multiple interface regions 301 on the GUI 302 of the electronic device 303; a second computer program code for detecting one of multiple gestures on one of the defined interface regions 301; a third computer program code for performing a first action associated with the recording of media data in one of the communication modes, on detection of a gesture on one of the defined interface regions 301; a fourth computer program code for detecting another gesture on the same one of the defined interface regions 301 or another one of the defined interface regions 301; and a fifth computer program code for performing a second action, in response to the detection of the other gesture on the same one of the defined interface regions 301 or the other one of the defined interface regions 301. The computer program product disclosed herein further comprises a sixth computer program code for triggering recording of the media data; a seventh computer program code for switching from one communication mode to another communication mode for recording the media data; an eighth computer program code for canceling the recording of the media data; and a ninth computer program code for generating and displaying multiple options for performing an operation associated with the recorded media data.

In an embodiment, the computer program product disclosed herein further comprises a tenth computer program code for associating a predefined function from multiple predefined functions with each of the defined interface regions 301 on the GUI 302; an eleventh computer program code for dynamically changing the predefined function associated with one of the defined interface regions 301 to another one of the predefined functions based on one or more communication modes and user preferences; and a twelfth computer program code for configuring predefined functions for one or more defined interface regions 301 based on the user's preferences. In an embodiment, the computer program product disclosed herein further comprises a thirteenth computer program code for streaming the media data to the server 804 via the network 803 continuously while recording the media data, or at predefined time intervals after initiation of the recording of the media data, or after completion of the recording of the media data.

The computer program product disclosed herein further comprises one or more additional computer program codes for performing additional steps that may be required and contemplated for recording the media data in one or more communication modes based on one or more gestures on the GUI 302 of the electronic device 303. In an embodiment, a single piece of computer program code comprising computer executable instructions performs one or more steps of the computer implemented method disclosed herein for recording the media data in one or more communication modes based on one or more gestures on the GUI 302 of the electronic device 303. The computer program codes comprising the computer executable instructions are embodied on the non-transitory computer readable storage medium. The processor 802 of the computer system 901 retrieves these computer executable instructions and executes them. When the computer executable instructions are executed by the processor 802, the computer executable instructions cause the processor 802 to perform the steps of the computer implemented method for recording the media data in one or more communication modes based on one or more gestures on the GUI 302 of the electronic device 303.

It will be readily apparent that the various methods, algorithms, and computer programs disclosed herein may be implemented on computer readable media appropriately programmed for computing devices, communication devices, and electronic devices. As used herein, the term "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc®, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hardwired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of programming languages that can be used comprise C, C++, C#, Objective-C, Java®, JavaScript®, Fortran, Ruby, Pascal, Perl®, Python®, Visual Basic®, etc. Other object-oriented, functional, scripting, and/or logical programming languages may also be used. The computer program codes or software programs may be stored on or in one or more mediums as object code. Various aspects of the method and system disclosed herein may be implemented as programmed elements, or non-programmed elements, or any suitable combination thereof. The computer program product disclosed herein comprises computer executable instructions embodied in a non-transitory computer readable storage medium, wherein the computer program product comprises one or more computer program codes for implementing the processes of various embodiments.

The present invention can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices may comprise processors, for example, the Intel® processors, Advanced Micro Devices (AMD®) processors, UltraSPARC® processors, Hp® processors, International Business Machines (IBM®) processors, RISC based computer processors of ARM Holdings, Motorola® processors, etc., that are adapted to communicate with the computers. In an embodiment, each of the computers is equipped with a network communication device, for example, a network interface card, a modem, or other network connection device suitable for connecting to a network. Each of the computers and the devices executes an operating system, for example, the Linux® operating system, the Unix® operating system, any version of the Microsoft® Windows® operating system, the Mac OS of Apple Inc., the IBM® OS/2, the Palm OS®, the Android® OS, the Blackberry® OS, the Solaris operating system developed by Sun Microsystems, Inc., or any other operating system. Handheld devices execute operating systems, for example, the Android operating system, the Windows Phone® operating system of Microsoft Corporation, the BlackBerry® operating system of Research in Motion Limited, the iOS operating system of Apple Inc., the Symbian® operating system of Symbian Foundation Limited, etc. While the operating system may differ depending on the type of computer, the operating system will continue to provide the appropriate communications protocols to establish communication links with the network. Any number and type of machines may be in communication with the computers. The present invention is not limited to a particular computer system platform, processor, operating system, or network. The present invention is not limited to be executable on any particular system or group of systems, and is not limited to any particular distributed architecture, network, or communication protocol.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A computer implemented method for recording media data, comprising:

providing a gesture based media recording application executable by at least one processor configured to manage a graphical user interface of an electronic device for said recording of media data in one or more recording modes on said electronic device;

defining one or more interface regions on said graphical user interface of said electronic device by said gesture based media recording application;

associating predefined functions to said one or more defined interface regions based on user preference;

detecting a first gesture from among multiple gestures on one of said defined interface regions, by said gesture based media recording application, wherein said first gesture is performed on a first of said defined interface regions, and wherein said first gesture is a press and hold gesture;

executing a predefined function associated with said first gesture, by said gesture based media recording application, wherein said execution of said predefined function associated with said first gesture comprises said recording of media data in a push to talk (PTT) recording mode;

dynamically changing, by said gesture based media recording application, functions associated with said one or more defined interface regions based on said detected first gesture;

detecting a second gesture from among said multiple gestures on one or more of said defined interface regions, by said gesture based media recording application, wherein said second gesture is a slide and release gesture from said first of said defined interface regions to a second of said defined interface regions, and wherein said recording of said media data continues uninterrupted during and after performance of said second gesture; and executing a predefined function associated with said second gesture, by said gesture based media recording application, wherein said execution of said predefined function associated with said second gesture comprises switching said recording of media data from said push to talk (PTT) recording mode to a tap to end (TTE) recording mode.

2. The computer implemented method of claim 1, further comprising:

detecting a third gesture from among said multiple gestures, by said gesture based media recording application, wherein said third gesture is a tap gesture on a third of said defined interface regions, and executing a predefined function associated with said third gesture, wherein said executing said predefined function associated with said third gesture comprises cancelling said recording of said media data, and wherein there is no transmission of already recorded media data to another electronic device or a server.

3. The computer implemented method of claim 1, further comprising:

detecting a third gesture from among said multiple gestures on said first of said defined interface regions or on said second of said defined interface regions, wherein said third gesture is a tap gesture, by said gesture based media recording application, and executing a predefined function associated with said third gesture, wherein said executing said predefined function associated with said third gesture comprises ending said recording of said media data.

4. The computer implemented method of claim 3, wherein said recorded media data is one or more of saved locally, deleted, or transmitted to another electronic device or the server.

5. The computer implemented method of claim 3, further comprising sending said recorded media data to the server via a network at one of: (a) continuously while recording said media data, (b) at predefined time intervals after initiation of said recording of said media data, and (c) after completion of said recording of said media data by said gesture based media recording application.

6. The computer implemented method of claim 1, wherein said media data comprises one of audio data, video data, audiovisual data, image data, multimedia data, and any combination thereof.

7. A computer implemented system for recording media data, comprising:

a processor;

a non-transitory computer readable storage medium communicatively coupled to said processor, said non-transitory computer readable storage medium configured to store a gesture based media recording application, wherein said gesture based media recording application, when executed by said processor, manages a graphical user interface of an electronic device for said recording of media data;

said gesture based media recording application comprising:

an interface definition module configured to define one or more interface regions on said graphical user interface of said electronic device, and to associate predefined functions to said one or more defined interface regions based on user preference;

a detection module configured to detect gestures on said defined interface regions; and an action management module configured to execute predefined functions associated with said gestures;

said execution of said gesture based media recording application comprising:

said defining said one or more interface regions on said graphical user interface of said electronic device;

said associating predefined functions to said one or more defined interface regions based on user preference;

detecting a first gesture from among multiple gestures on one of said defined interface regions, wherein said first gesture is performed on a first of said defined interface regions, and wherein said first gesture is a press and hold gesture;

executing a predefined function associated with said first gesture, wherein said execution of said predefined function associated with said first gesture comprises said recording of media data in a push to talk (PTT) recording mode;

dynamically changing functions associated with said one or more defined interface regions based on said detected first gesture;

detecting a second gesture from among said multiple gestures on one or more of said defined interface regions, wherein said second gesture is a slide and release gesture from said first of said defined interface regions to a second of said defined interface regions, and wherein said recording of said media data continues uninterrupted during and after performance of said second gesture; and executing a predefined function associated with said second gesture, wherein said executing said predefined function associated with said second gesture comprises switching said recording of said media data from said push to talk (PTT) recording mode to a tap to end (TTE) recording mode.

8. The computer implemented system of claim 7, wherein said execution of said gesture based media recording application further comprises:

detecting a third gesture from among said multiple gestures, wherein said third gesture is a tap gesture on said third of said defined interface regions, and executing a predefined function associated with said third gesture, wherein said executing said predefined function associated with said third gesture comprises cancelling said recording of said media data, and wherein there is no transmission of already recorded media data to another electronic device or a server.

9. The computer implemented system of claim 7, wherein said execution of said gesture based media recording application further comprises:

detecting a third gesture from among said multiple gestures on said first of said defined interface regions or on said second of said defined interface regions, wherein said third gesture is a tap gesture, and executing a predefined function associated with said third gesture, wherein said executing said predefined function associated with said third gesture comprises ending said recording of said media data.

10. The computer implemented system of claim 9, wherein said recorded media data is one or more of saved locally, deleted, or transmitted to another electronic device or the server.

11. The computer implemented system of claim 9, further comprising sending said recorded media data to the server via a network at one of: (a) continuously while recording said media data, (b) at predefined time intervals after initiation of said recording of said media data, and (c) after completion of said recording of said media data by said gesture based media recording application.

12. The computer implemented system of claim 7, wherein said media data comprises one of audio data, video data, audiovisual data, image data, multimedia data, and any combination thereof.

* * * * *